United States Patent [19]

Spence-Bate

[11] 4,027,968

[45] June 7, 1977

[54] CAMERA MECHANISM

[76] Inventor: Harry Arthur Hele Spence-Bate, Lot 115, Cheam Place, Morley, Australia, 6062

[22] Filed: June 24, 1975

[21] Appl. No.: 589,928

[52] U.S. Cl. .................................. 355/46; 350/254; 354/197; 355/20; 355/71
[51] Int. Cl.² ......................................... G03B 27/32
[58] Field of Search ............... 354/197; 355/46, 20, 355/43, 71, 56, 57, 60; 350/254, 6

[56] References Cited

UNITED STATES PATENTS

| | | | |
|---|---|---|---|
| 2,496,272 | 2/1950 | Ceirrent | 355/46 X |
| 2,672,799 | 3/1954 | Terirllige | 355/71 X |
| 3,185,061 | 5/1964 | Westphalen | 354/197 |
| 3,295,409 | 1/1967 | Delirie | 355/46 |
| 3,345,924 | 10/1967 | Kitrossen | 355/43 X |
| 3,617,125 | 11/1971 | Sobottke | 355/46 |
| 3,620,623 | 11/1971 | Reams, Jr. | 355/46 |
| 3,677,146 | 7/1972 | Nielsen | 355/20 X |
| 3,689,149 | 9/1972 | Levingood | 355/46 |
| 3,826,571 | 7/1974 | Spence-Bate | 355/46 |
| 3,841,875 | 10/1974 | Park | 355/71 X |

*Primary Examiner*—Edna M. O'Connor
*Attorney, Agent, or Firm*—Fidelman, Wolffe & Waldron

[57] ABSTRACT

A camera for selectively filming at least two separate types of input images through at least one first and second object lens. Each first object lens is mounted on a part rotatable support which is in turn mounted on a rotatable lens carrier. Also mounted on the support are optical deflectors arranged to direct the image of a second object on to the film. In an alternative embodiment the second object lenses and deflectors are mounted on separate slides.

10 Claims, 25 Drawing Figures

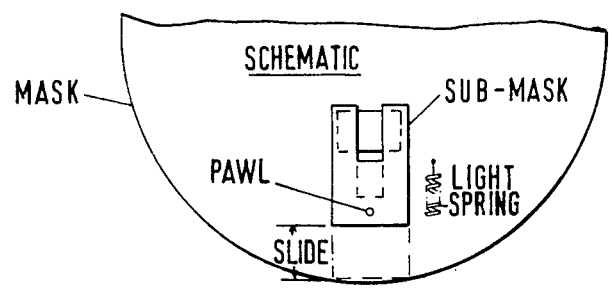
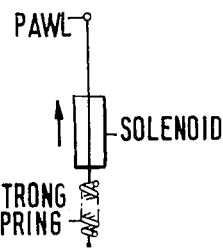
FIG. 6.
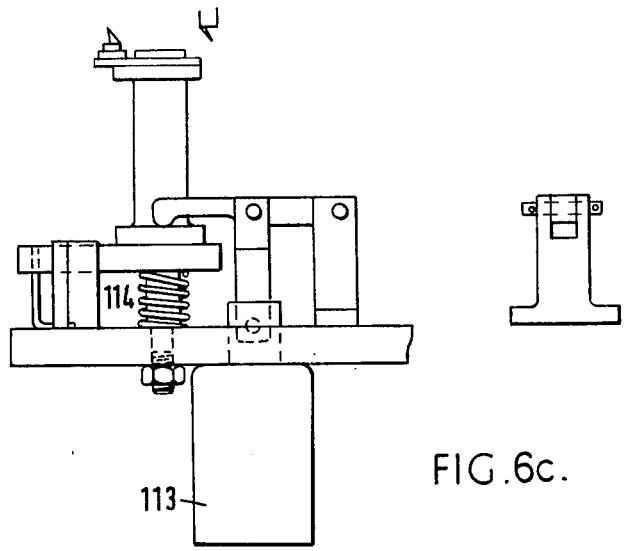
FIG. 6c.

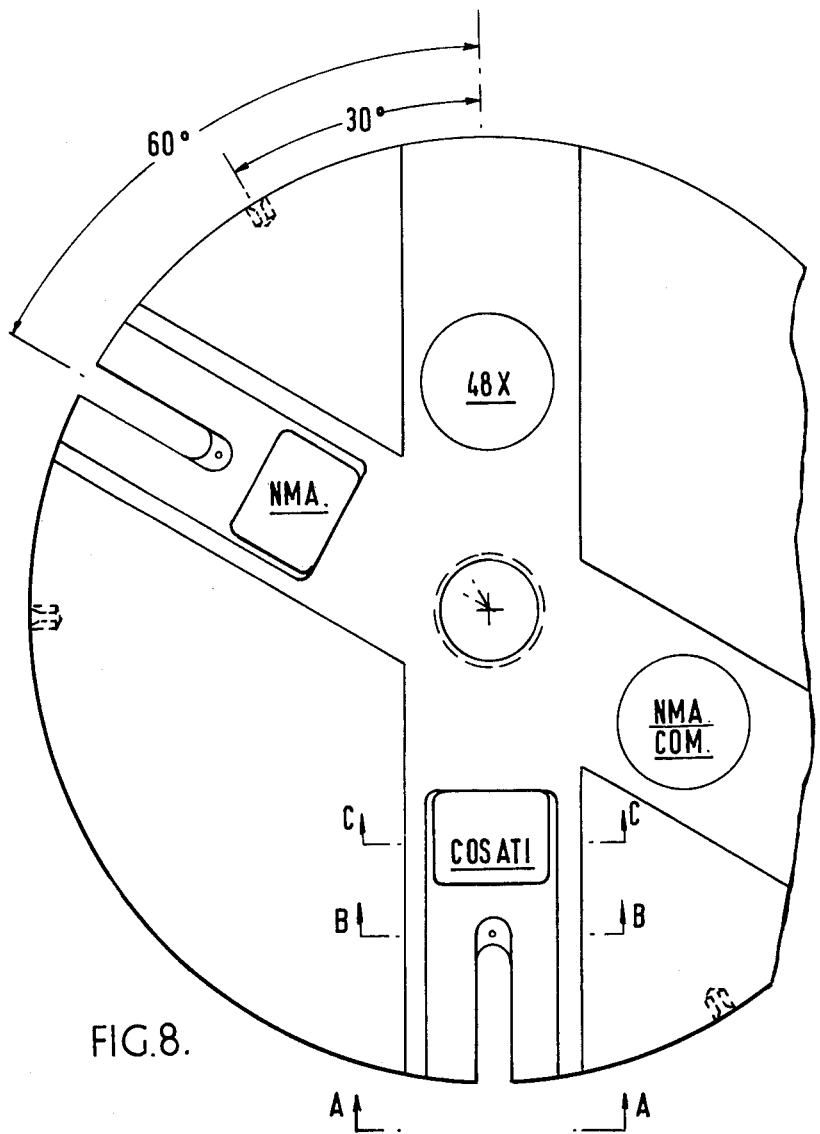

VIEW FROM A-A

SECTION B-B

SECTION C-C

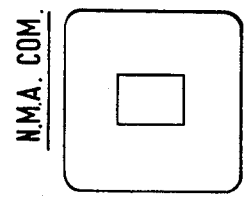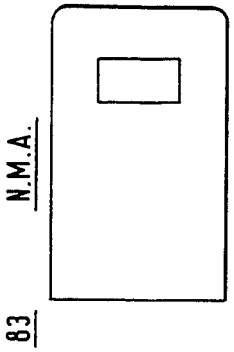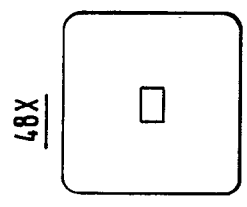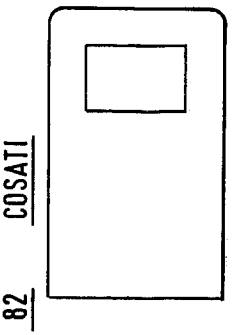
FIG.10A  80  48X
FIG.10B  81  N.M.A. COM.
FIG.10C  82  COSATI
FIG.10D  83  N.M.A.

CAMERA MECHANISM

The present invention relates to a camera and more particularly to the problem of recording images from at least two possible sources on a film.

In my U.S. Pat. No. 3,826,571 there is described such a camera in which several object lenses and optical deflectors are mounted on carriers which are rotatable about a central axis parallel to a recording optical axis. Such an arrangement enables a selected object lens and deflector to be brought into use in the optical axis by rotating the lens carrier. In very high speed work where rapid shift between one optical input to another is required when, for instance, changing from a computer input from a C.R.T. to a laser input or conventional optical input the mass of equipment moved by the lens carrier motor is considerable in terms of the optimum time required to move the lens carrier. Hereafter, optical input from a computer through a cathode ray tube or laser is referred to as "COM" while optical input from a conventional source is referred to as "CON".

Accordingly there is provided by the present invention a camera provided with a film carrier, a plurality of first object lenses, and a corresponding optical deflector for each object lens both mounted for partial rotation on a part rotatable support, said support being mounted on a rotatable lens carrier, means for partially rotating said support so as to move one said deflector into or out of a first optical recording path leading to the film carrier.

The advantage of such an arrangement according to the invention is that the lens carrier itself need only be moved when a standard is to be changed whereas if the input is required to be changed, then only the part rotatable support of minimum mass need to moved.

Another camera according to the invention has instead of the part rotatable support a sliding reflector and/or lens carrier which is arranged to cooperate with a rotatable lens carrier which is mounted about an axis at right angles to an optical recording paths leading past shutter blades to a film carrier.

This arrangement whilst not so compact as the first arrangement is nevertheless simple to operate and construct.

Preferably the camera is provided with a rotatable masking plate provided with a plurality masking apertures for differing standards. Separate sub masks can be provided at one or each aperture to further mask the aperture. This arrangement enables the standard used to be changed from a single or double standard without moving the whole mass of the masking plate.

The invention will not be described with reference to the accompanying drawings in which:

FIG. 7 shows details of a typical bearing for a combined assembly of mask, lens-turret deflectors or invertors, shutter blades and similar.

FIG. 8 shows a versatile rotatable circular mask disc to which interchangeable image plates and single and double Fiche slides can be fitted.

FIGS. 10A-10C show examples of interchangeable image plates, example for use with the rotatable mask of FIG. 2.

Figure 1:
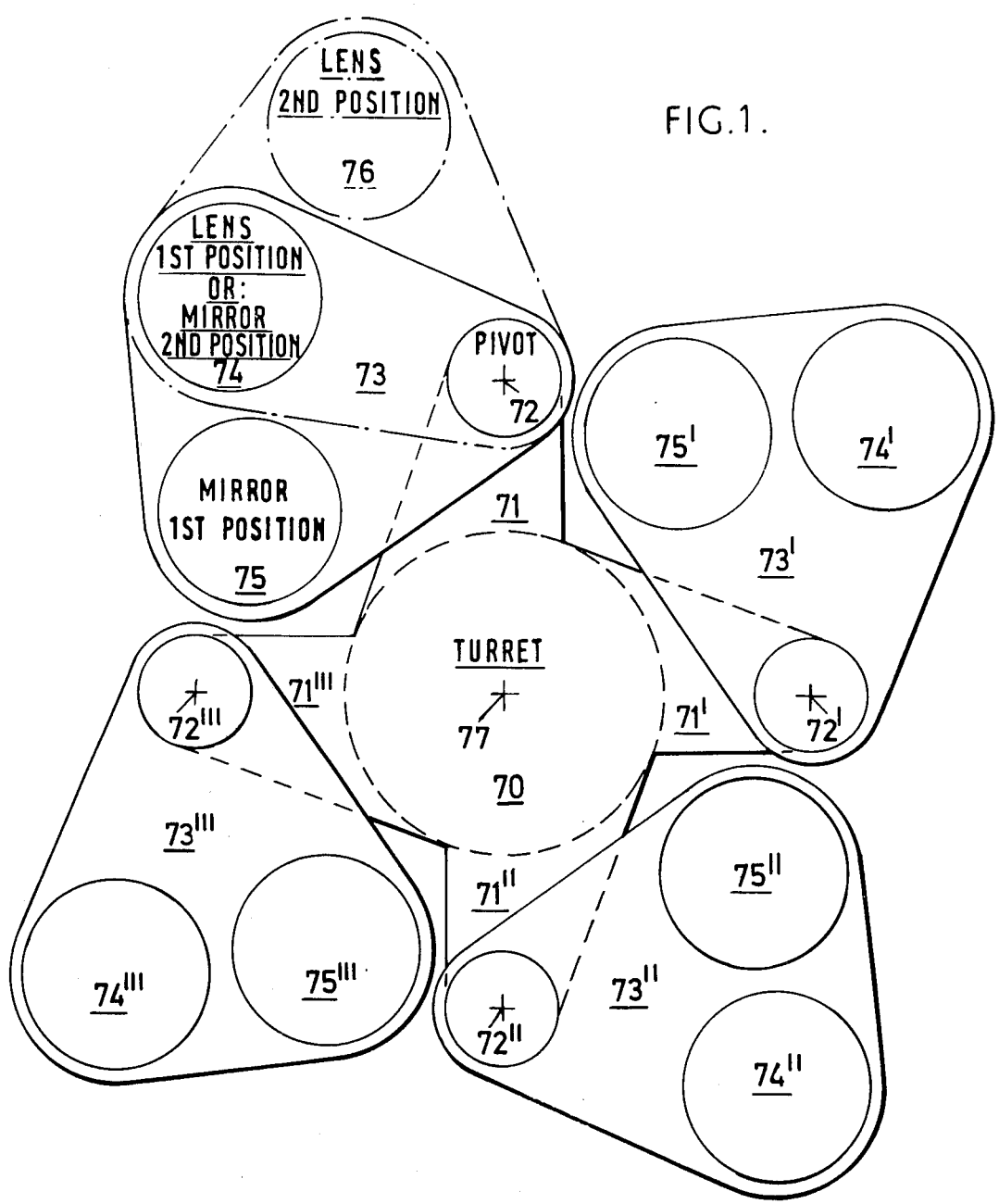
FIG. 1 shows one lens carrier according to the invention.
Figure 13:
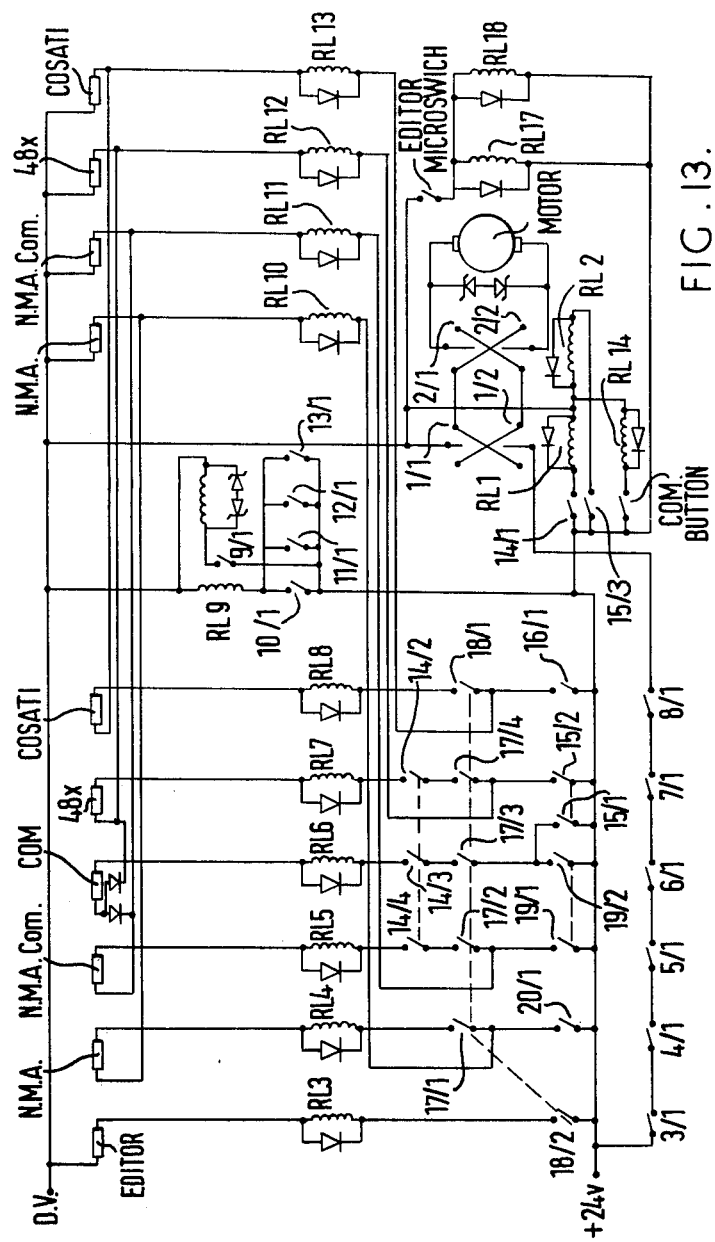
Figure 14:
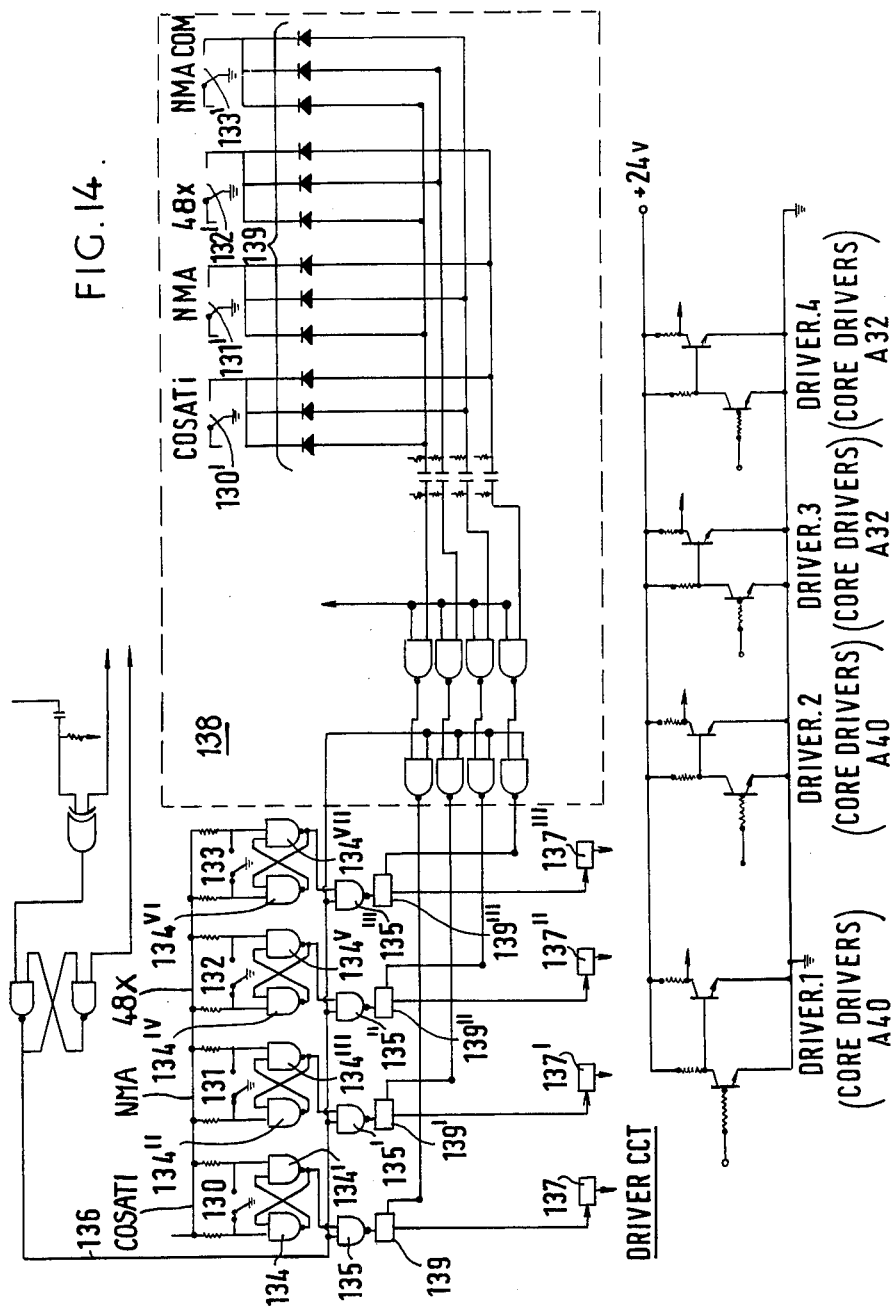
Figure 15:
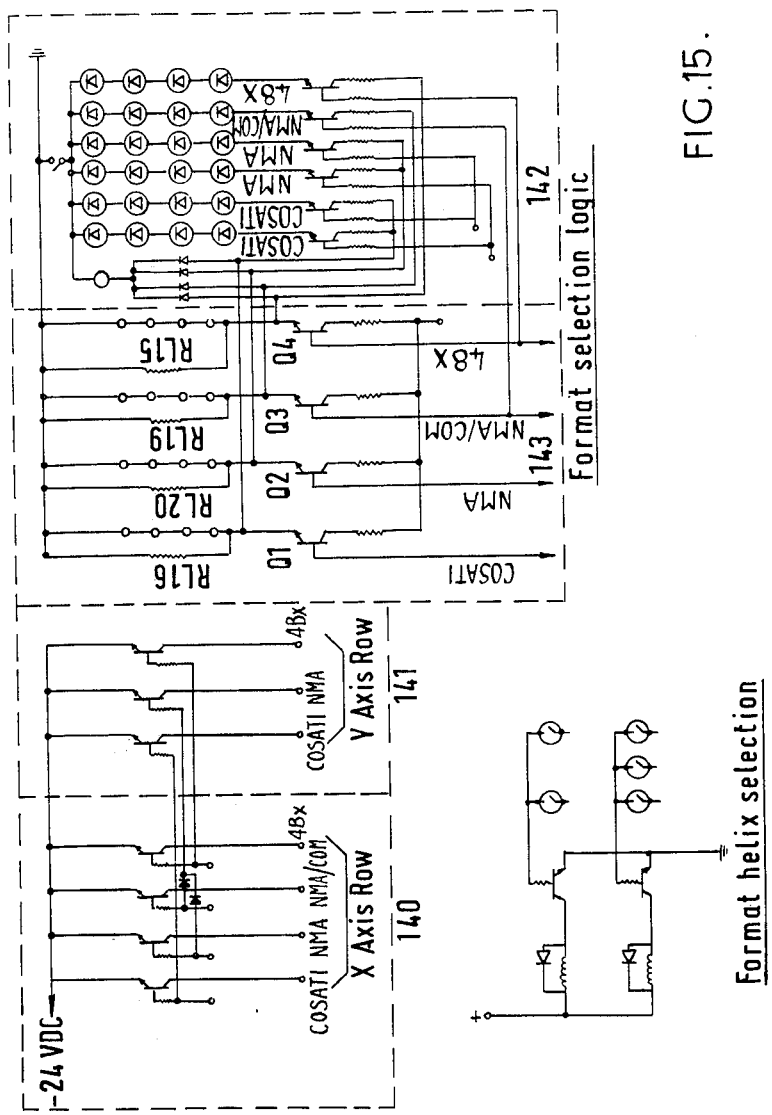

FIGS. 13, 14, and 15 show control circuitry for the embodiment of FIG. 1.

An alternative way of arranging the lenses and mirrors to U.S. Pat. No. 3,826,571 is to mount every lens and mirror on a separate plate or support and imparting movement only to these parts but then the mechanics become more involved. Such an arrangement is shown in FIG. 1 in which may be seen a centrally pivoted rotatable turret member 70, from which extend four radial arms 71, 71', 71", and 71'''. At the end of each arm 71, 71', 71" and 71''' there is pivoted about separate pivots 72, 72', 72" and 72''', separate plates or supports 73, 73', 73" and 73''' one on the end of each arm. Each plate 73 (73' 73" or 73''') has a lens 74 (74', 74" or 74''') and mirror 75 (75', 75" or 75'''). The lenses and mirrors have the same function as those shown in FIG. 1a, 1b and 1c.

It will be seen in FIG. 1 that a second lens position 76 is provided by pivoting plate 73 clockwise about its pivot 72 whilst the turrent 70 is stationary on its pivot 77. The mirror 75 takes up the first lens position 74 in the optical axis of the camera.

The purpose of the arrangement shown in FIG. 1 is to assist the change from CON to COM very quickly. The advantage is that when high speed changes are made because only a small part of the rotatable turret has to move the weight of moving parts is reduced to a minimum and therefore inertia and kinetic energy are kept to a minimum. This in turn allows higher operation speeds and less strain on the arrangement.

Although in FIG. 1 four plates 73, 73', 74" and 73 ''' are shown an arrangement within the scope of the invention might well have only one plate or equally have two, three, five or six plates or conceivably in a very complex camera even more plates.

Figure 2:
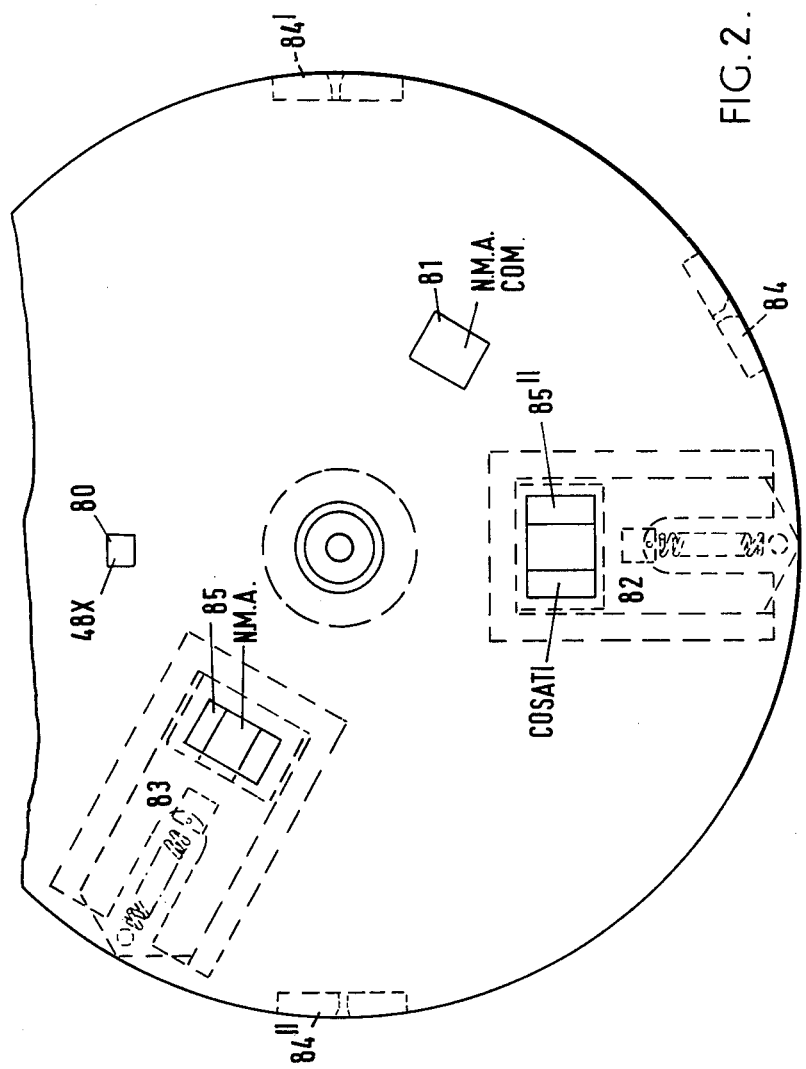
FIG. 2 shows in plan view a rotatable mask which carries the image size of a number of standards such as COSATI, N.M.A., MINICATS and so on. There is also shown the easy means for a complete change of standards as well as the instant single or double Fiche facility.

FIG. 2 shows a plan view mask disc on which, in this case, four standards are shown. Within the aid of FIGS. 9 and 10 it can be seen how images can be easily changed by means of inserts 80–83 shown as FIGS. 10A-D. FIG. 10A, element 80, shows the MINICAT standard; FIG. 10B, element 81, depicts the N.M.A. COM standard; FIG. 10C. element 82, shows the COSATI standard while FIG. 10D, element 83, depicts the N.M.A. commercial standard. The relative size of the fiche image area is depicted by these drawings; the actual width of COSATI standard being 11.25 mm and for N.M.A., 9.5mm. These last two are the most used standards, but the mask assembly can accommodate image plates conforming to any other standards. These named standards are internationally recognized standards which define the frame size and the reduction ratio of a standard page. The mask is driven by the turret and final mask plate positioning and arresting is effected by the mask plate locators 84 in conjunction with a plunger operated by a solenid. When the mask is in a operator selected position and aligned with the correct lens the action stops there. If on the other hand this is not the case, the turret moves independently of the mask by means 104 shown on FIG. 7 until correlation has been achieved.

FIG. 2 also illustrates the single-double Fiche slides in their retracted position as here drawn in the single mode 85. COM and MINICATS are only used as singles and therefore no slide is fitted.

Figure 6A:
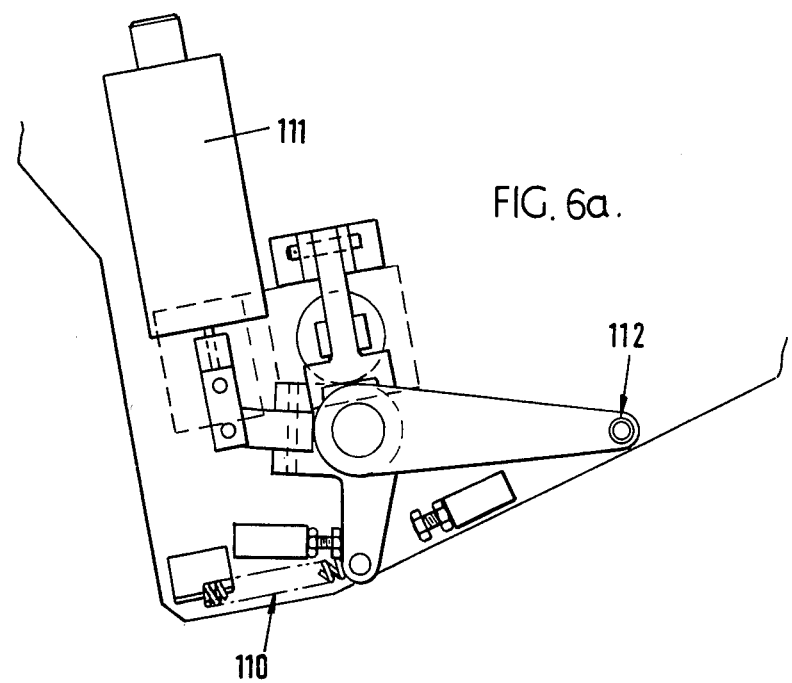
FIGS. 6 to 6c shows the self-releasing and homing mechanism used in connection with a single-double Fiche or similar facility.
Figure 6B:
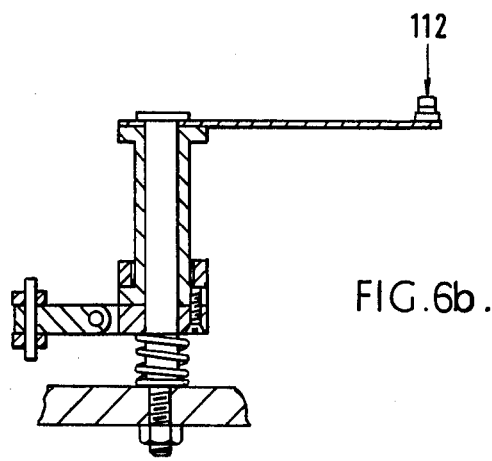
Figure 11A:
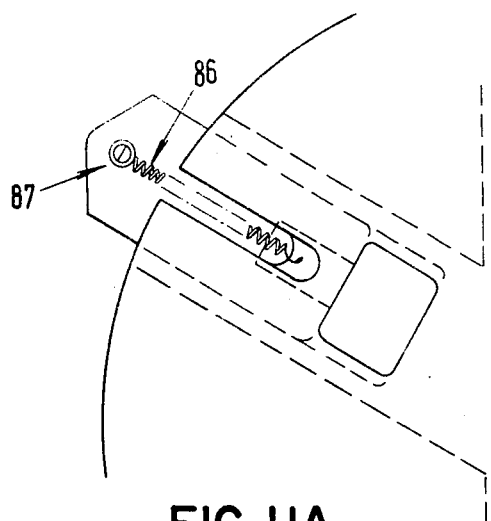
FIGS. 11A-11B show a double Fiche slide and homing arrangement for the single and double slide.
Figure 11B:
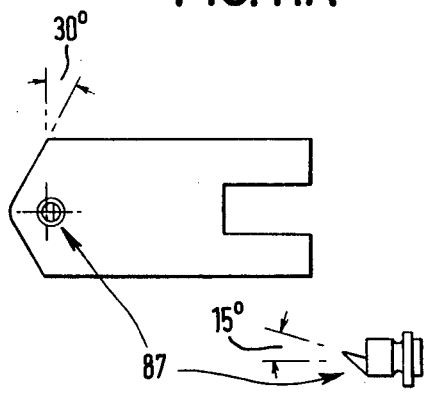

FIG. 11 shows the single-double Fiche slide in the double mode. As is evident from the drawing, the slide in the double mode unmasks a frame image having a width double that of the slide in the single mode. The light homing spring 86 is extended by means of an arrangement shown in FIG. 6. The word light has been used advisedly and will be referred to presently. The slide gives one a facility for single and double Fiche at any position, in other words, for every standard without having to employ movement to the entire circular mask disc. This is very important not only for changeover speed, but also for electronic control reasons, Furthermore it allows for more standards to be accommodated on one mask disc. For speedier recall from conventional photography to COM and back, the mask can be held stationary while the turret is programmed to move clockwise or anticlockwise in and out of CON/COM work with the minimum of electrical and/or electronic logic commands. The lever or pawl that engages onto 87 and pulls out the mask-slide, not only moves around its pivot by also moves along its length up and down, up and down being as seen when the arrangement has the mask in the horizontal plane. Normally the pawl is outside the path of the mask and there is no interference with the rotation of the whole mask assembly. When no command is given to the slide withdrawal arrangement, photography takes place in the single mode. On pressing the double-Fiche button on the camers, the pawl moves down and places itself behind the slide-mask engagement which is biased towards the centre by the weak or light spring already mentioned on the mask assembly. The lever carries a spring 110 which is stronger, (see FIG. 6a) and can override the weak spring on the mask. The stronger lever spring enables the power, let us say from a solenoid 111 (FIG. 6a) to be taken off once the docking by means of 112 to element 87 shown in FIGS. 11A and 11B has been accomplished and the stronger spring pulls out the mask with no further requirements on electrical energy. As the rest position of the withdrawal mechanism due to 110 is outwards, that is away from the mask, this allows free rotation to the mask and no extra mechanics have to be made for this purpose.

Because of the instantaneous nature of the arrangement 9 (a smaller number of milliseconds) the solenoids can be rated for a very short on-period. Thus for a given power, smaller solenoids can be used which is a further advantage of this scheme.

FIG. 6c shows the downstroke solenoid 113 and the restoring return spring 114. Again energy is applied only momentarily with the same advantages already described, i.e. no constant drain on the power supply.

Returning to the slides when disengagement, that is when single Fiche is wanted, solenoid 113 pulls down the lever or pawl and both the slide mask and the withdrawal mechanism spring into their respective rest positions. If the mask is made to move to a differnt standard, disengagement follows automatically and no jamming can possibly occur.

Figure 3:
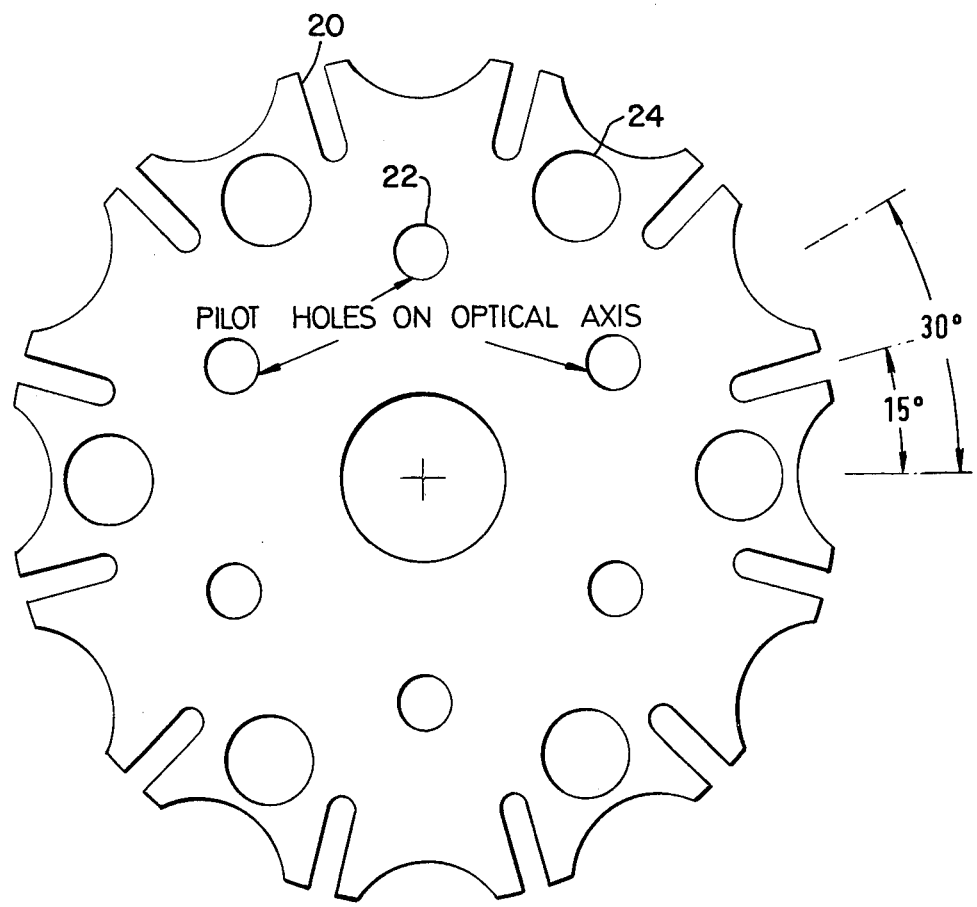
FIG. 3 shows inplan the geneva-wheel-lens-turret which enables a fast drive and accurate location of auxiliary attachments by motor drive initiated by the appropriate press button on the control panel.

FIG. 3 shows the lens turret plate where positional pilot holes have been drilled for the location of lenses, prisms, mirror, inverters and the like. The turret plate, upon which is mounted the radial arms shown in FIG. 1, may be in the form of a geneva wheel which is a conventional device for obtaining intermittant motion. A cam on a driving wheel engages slots 20 in the driven wheel which in this case is the turret plate. Rotation of the driving wheel causes advancement of the driven wheel by an angular increment determined by slot spacing. In the arrangement illustrated, slot spacing is 30° which allows intermittant motion of the turret plate in 30° increments. Positional pilot holes 22 are drilled in the turret plate on centers equidistant from the axis of the turret plate and coinciding with the optical axis of the camera. Pivoted plates or supports, shown as elements 73 of FIG. 1, may be mounted so as to pivot about holes 24 on the turret plate. The proper size holes or openings and fittings are added later in accord with the programme the customer chooses to undertake. Although the turret-geneva-wheel arrangement is standard, the lens complement and auxiliaries can be special, thus giving the device great versatility.

Figure 4:
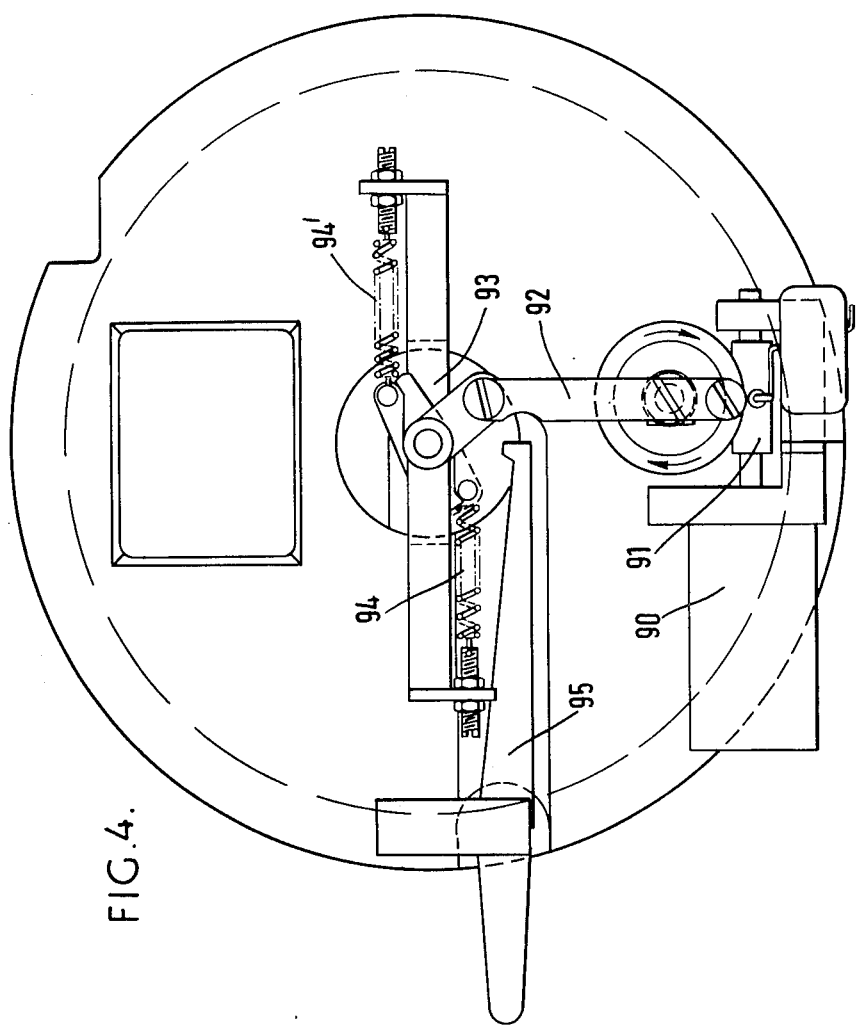
FIG. 4 shows the bottom plan view of an alternative shutter arrangement.
Figure 9A:
FIGS. 9A-9C are sections taken along lines A—A, B—B, and C—C of FIG. 8, respectively.
Figure 9B:
Figure 9C:

FIG. 4 shows a further embodiment of a shutter mechanism. FIG. 8 illustrates in plan view another embodiment of the rotatable mask shown in FIG. 2. The mask carries the image size of a number of standards and is rotatable about its axis to bring the desired image mask into the optical axis of the camera. FIGS. 9A, 9B and 9C are sectional views taken along axes A—A, B—B, and C—C respectively, of FIG. 8.

Figure 5A:
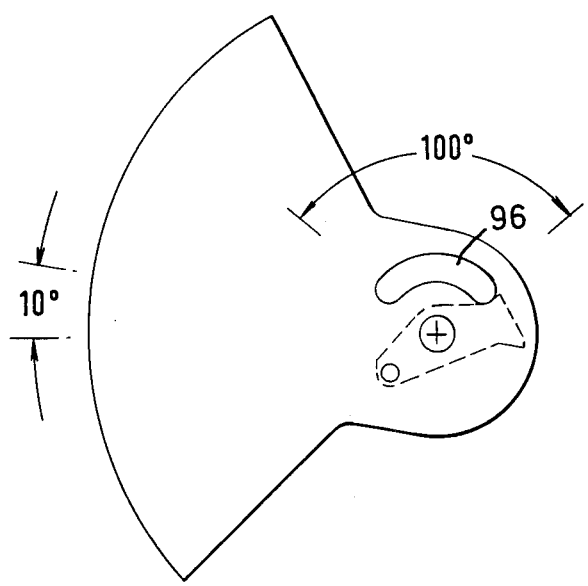
FIGS. 5A and 5B show blades used with the alternative shutter arrangement.
Figure 5B:
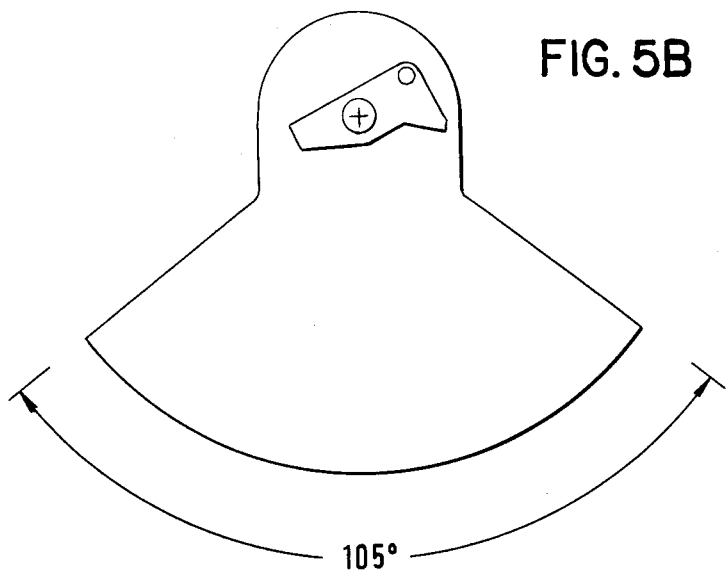

FIGS. 10 A–D illustrate the relative image sizes of mask plates conforming to international standards which can be used with the rotatable masks illustrated in FIGS. 2 and 8. Motor 90 worm-wheel drive 91 cause a reciprocating movement on 92 similar to a con-rod on a motor car engine. This movement is transferred to a spring tensioning device at 93. The springs 94 and 94' get tensioned up and two pawls 95, only top one visible on FIG. 8, arrest the shutter blades shown in FIGS. 5A and 5B in their tensioned up position by means of the arrangement shown. The shutter blades although being, so to speak, wound up simultabeously, can move relatively to each other so that when shutter blade one of FIG. 5A is released this opens the shutter aperature and when shutter blade two of FIG. 5B is released the shutter closes. The relative movements of the two blades is enabled by the circular slot 96. The release of pawls 95 shown in FIG. 4 are initiated by matched solenoids. The first one gets its command from the operator's control board while the other is released by an electronic timing device which monitors the light and ensures correct exposure.

Figure 7:
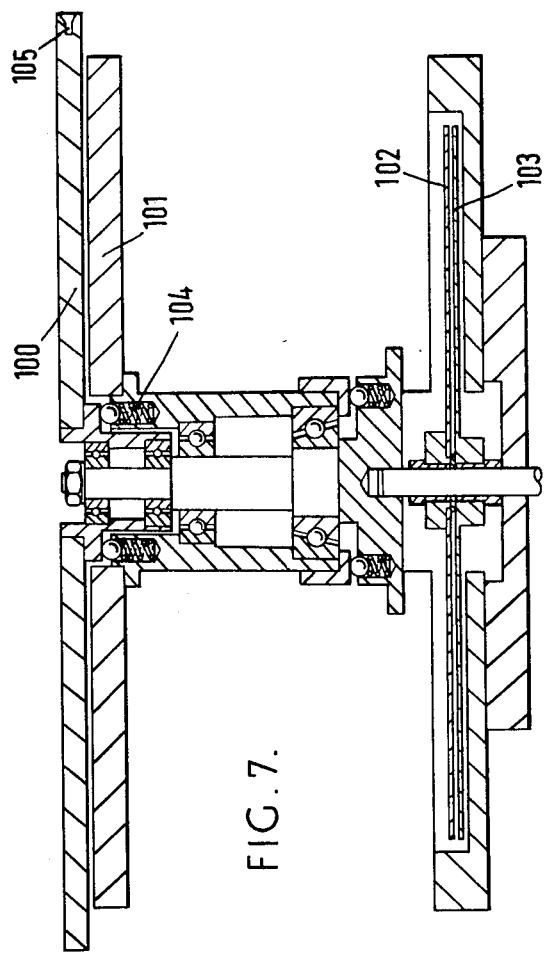

FIG. 7 as mentioned earilier gives a typical bearing assembly where 100 is the main mask, 101 the geneva-wheel turret, 102 and 103 the shutter blades. The turret 101 drives the mask through a series of spring loaded ball bearings. The exact location of the mask is effected by a plunger engaging in 105. The plunger is solenoid operated.

A further embodiment which is not so advantageous will be briefly mentioned namely that the main circular mask disk carries a number of smaller circular sub mask disk so arranged that they can place different smaller image sizes over the maximum size of every particular image position or standard, this around the whole main circular mask disk used in a similar design concept to the above.

Another embodiment that does not have the compactness and versality or the speed of operation of the above will nevertheless be now described. In this further embodiment shown in FIG. 12, there is provided a shutter with only blades 120 shown for controlling the exposure length as well as a slide 121 mask accomodating a number of standard image sizes.

Figure 12:
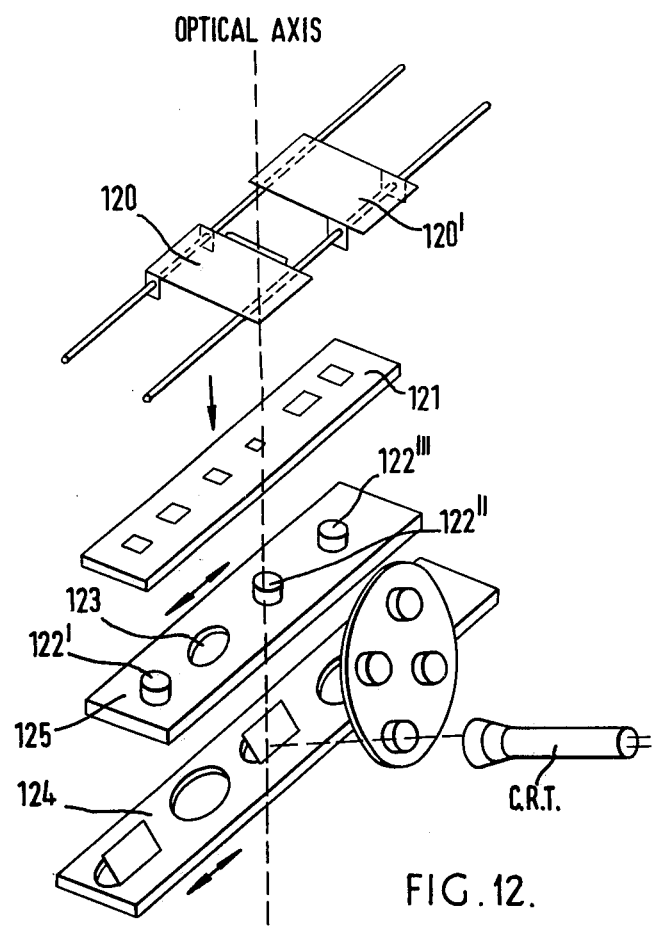
FIG. 12 shows an alternative embodiment of the shutter and mask carrier.

FIG. 12 also shows a sliding carrier 125 for a microfilm camera on which several lenses are mounted 122 and/or hole 123 to let light rays pass unhindered when placed on the optical axis; a second slide 124 has a number of semi and a fully silvered mirror attached to is so they can pick up intelligence presented to them by a cathode ray tube and by pass holes for CON only. The turret in fromt of the cathode ray tube is linked with the carrier 125 and provides optical corrections to the main lenses and the extra lens is used for the sole photography of the cathode ray tube. As shown, the diagram depicts CON/COM superimposition. The whole arrangement has been drawn in the three main lens configuration but, of course, the exact number of lenses depends on the range of optical tasks required by the system. The degree of silvering of the mirrors brings out the relevant importance of the supimpositions. The above are physical alternatives to some of the embodiments and ideas already described in detail.

In order to reduce the back focal length distance a large disk or part reciprocating disk shutter is used as described previously, or alternatively a focal plane shutter is used in its electronic operation essentially similarly to the shutter already mentioned. To reduce back focal length to an absolute minimum, the guides on which the blades run are separated sufficiently to allow the lens mount to nestle in between these guides thus practically reducing the back focal length to the shutter blade and mask to a matter of a fraction of an inch. This is important when extreme reductions ratios are contemplated. The lenses described previously run inside this channel and all controlling gear of the shutter mechanism is offset so as not to interfere with this free run of the slides.

In order to able to use extremely lightweight very thin shutter blades the mask 121 can act as their support and for this reason may be placed, looking at the sectional elevation on FIG. 12, below the shutter blades 120 and 120'. A modified traditional several bladed shutter could also be used.

Returning to the compact previous embodiments, these opto-mechanical arrangements enable partial or selective utilization of their individual functions. For the purpose of, for example, Fiche image to FIche image transfer or editing, the turret lens can be by-passed and a relatively long focal length lens (this lens can be moved as regards the front and back focal lengths and automatically focussed to allow for variable magnifications) can be placed below the shutter. This stll allows the use of the shutter, the multiple mask or invertors and like. An existing Fiche is placed in a holder which permits movement in the $x$ and $y$ directions, the wanted image is selected and is copied mostly at a ratio of 1:1 onto the Fiche being processed, preferable the light of the existing document platten is utilized for this purpose. The Fiche-holder and its associated lens can be brought in or out of the optical axis whenever required so that intelligence from documents, COM, or existing Fiche can be fed onto one and the same lamina at any time and in any required order.

Electro-electronic four standard select and auxiliary drive and control systems are shown in FIGS. 13, 14 and 15. Four illiminated push buttons 130 are provided, each of the double pole/doulbe throw impulse type (see FIG. 14). The first half of a DPDT switch serves to provide selection of the particular format whilst, simultaneously the second half provides a pulse to reset outputs of all remaining switches.

Each format selection switch is provided with electronic debouncing by-stable circuit 134, a nand gate to provide input from the debouncing circuit and an inhibit line 136 to prevent format change whilst the camera is in operation.

Each nand gate output clocks a resetable JK type circuit 139, 139', 139'', 139''' which feeds output to direct coupled integrated circuits 137 137', 137'', 137''' and power transistor amplifiers (as shown in FIG. 15).

The reset circuits enclosed in dashed rectangle 138 are fed via a diode matrix, one shot timer and nand gate circuit with inhibit to provide the reset facility to the JK circuits.

Details of the transistor drive circuits in 137, 137', 137'', 137''' are shown as Driver 1, Driver 2, Driver 3, and Driver 4. Each driver output fans out to the output transistors (as shown in FIG. 15) via their respective decoupling resistors.

The Circuits 140 and 141 in FIG. 15 respectively control selection of numerous reed switches which determine the precise location of the camera film patten. Details of the film platten locations have been referred to in separate specification.

Circuit 142 shows area locations for precise positioning of the original when placed upon the document platten by illuminating the extremities of the selected area with light emitting dishes.

Circuit 143, using transistors Q1, Q2, Q3 and Q4, switch on illuminated microfiche on the upper display area of the camera and clearly indicate the standard format which has been selected. Furthermore a particular relay, FIG. 15 (contacts shown on FIG. 13) RL15, RL16, RL19 and RL20 is selected, again according to what standard format has been chosen. Relays RL15, RL16, RL19 and RL20 respectively control the precise selection of the mask lens turret assembly until its peripheral magnet comes within close proximity, for example to its at 'X reed switch, causing an electrical circuit to become complete from the 0 voltage line via the 48X mask reed switch, the 48X turret reed switch, RL7 relay coil, COM relay contact14/3 (normally closed), editor relay contact (normally closed) and relay contact 15/2, which was originally selected.

When a particular format is selected, that is COSATI, N.M.A., N.M.A./COM or 48X, one of the relays RL15, RL16; RL19 or RL20 become energised. For example, if 48X format is selected, all other previously selected format information would be cancelled and signal to select the 48X format only would be initiated. Referring to FIG. 15, RL15 would become emergised causing (refer to FIG. 13) contacts 15/1 and 15/2 to close.

It should be noted that the drive motor is already in motion from initial power switch on via the bail contact circuit 3/1, 4/1, 5/1, 6/1, 7/1, 8/1 and the dual reversing relay contacts 1/1, 1/2, 2/1, 2/2. The mask assembly is now locked to and rotating with the lens assembly. Both mask and lens assembly having magnets enbedded in their peripheries.

An electrical circuit is now complete from the 0 volt line via the 48X mask reed switch through relay coil RL12 and relay contact 15/2 to the plus 24 volt supply line. When the mask peripheral magnet comes within close proximity to the 48X mask reed, relay RL12 becomes energised and contact 12/1 closes thereby causing RL9 to operate whereby contact 9/1 opens and de-energises the electric solenoid SOL. This causes a pin to drop into the mask periphy resulting in accurate location.

Because of the nature of the mechanics involved, the lens assembly continues to rotate.

Because RL7 is now energised, contact 7/1 opens and the drive motor stops. NMA, NMA/COM and COSATI formats are selected in similar manner. If any of the COM standards have been selected, that is NMA/COM or 48X, the turret can be moved into the COM position without having to relocate the mask. Movement of the turret through the shortest possible arc is acheived by using double reversing relays R21 and R22, and the isolating contacts 14/4 and 14/2.

Edit facilities are obtained by closing the edit switch, causing relays RL17 and RL18 to energise. Contact 18/2 closes and contacts 18/1, 17/1, 17/2 and 17/4 open causing the turret to rotate until the peripheral magnet locates the editor reed switch. Relay RL3 becomes energised and contact 3/1 opens, causing the motor to stop with the turret accurately located in the edit position.

What I claim is:

1. Optical input means for a microfiche camera adapted to allow selective filming of inputs from at least two different optical sources which comprises:
    a rotatable turret plate having mounted thereon a plurality of pivoted support plates, each support plate carrying a lens and a mirror and adapted to pivot in the plane of the turret plate between two positions, the first of said positions placing the lens in the optical axis of the camera and the second of said positions placing the mirror in the optical axis of the camera.

2. The means of claim 1 further including a masking means adapted to be disposed in the optical axis of said camera and in the back focal plane of said lens.

3. The means of claim 2 wherein the masking means is provided on a mask plate which can be shifted to provide different size masks.

4. The means of claim 3 wherein the mask plate is rotatable about the same axis as the rotatable, turret plate wherein the mask comprises a plurality of masking apertures and wherein at least one sub mask is provided on the mask plate so as to further mask at least one said aperture.

5. The means of claim 4 wherein said sub mask is mounted in guides for radial movement toward or away from the mask plate axis.

6. The means of claim 5 wherein the sub mask is urged toward the mask axis by a weak spring and wherein engagement means are provided adjacent the mask plate to engage the sub mask and draw said sub mask into position away from the axis of the mask plate against the action of the weak spring.

7. The means of claim 6, wherein the engagement means comprises a pawl means actuated with an engagement position with the sub mask by a solenoid against the action of a strong spring, whereby on switching off the actuation current provided to the solenoid the strong spring overcomes the action of the weak spring to draw the sub mask away from the mask plate axis.

8. A camera provided with a film carrier, a shutter having shutter blades, a plurality of first object lenses,
    a mask provided in the back focal plane of said lenses,
    an optical deflector associated with each object lens mounted on a first slide means for movement into and out of an optical path leading past said shutter blades to said film carrier,
    at least one mask provided on a second slide means mounted between the first slide and said shutter blades for movement across said optical path,
    a rotatable lens carrier mounted about an axis at right angles to said optical path, wherein the first object lenses are mounted to said carrier.

9. A camera as claimed in claim 8 wherein said camera is a microfiche camera.

10. A camera as claimed in claim 8 wherein a cathode ray tube is mounted to project an image through at least one of said first object lenses.

* * * * *

UNITED STATES PATENT OFFICE
CERTIFICATE OF CORRECTION

PATENT NO. : 4,027,968
DATED : June 7, 1977
INVENTOR(S) : H.A.H. Spence-Bate

It is certified that error appears in the above-identified patent and that said Letters Patent are hereby corrected as shown below:

Please insert the following on the title page of the Letters Patent after [21] Appl. No.: 589,928:

[30] Foreign Application Priority Data
June 26, 1974      Australia ..........70526/74

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*